United States Patent [19]

Takayama et al.

[11] 4,159,433
[45] Jun. 26, 1979

[54] ELECTRICAL SPEED SENSOR

[75] Inventors: Katuki Takayama, Chiryu; Kojiro Mori, Okazaki; Hiroyuki Amano, Chiryu, all of Japan

[73] Assignees: Aisen Seiki Kabushiki Kaisha, Kariya; Toyota Jidosha Kogyo Kabushiki Kaisha, Toyota, both of Japan

[21] Appl. No.: 825,159

[22] Filed: Aug. 16, 1977

[30] Foreign Application Priority Data

Aug. 19, 1976 [JP] Japan ............................. 51-111033[U]

[51] Int. Cl.² ........................................... H02K 19/20
[52] U.S. Cl. .................................. 310/168; 310/75 R
[58] Field of Search ................... 310/168, 111, 155, 79, 310/75 R, 75 D; 324/173; 188/181 R

[56] References Cited

U.S. PATENT DOCUMENTS

| 3,764,837 | 10/1973 | Burckhardt et al. | 310/79 X |
| 3,881,123 | 4/1975 | Paul | 310/168 |
| 3,928,802 | 12/1975 | Reinecke | 310/168 X |
| 3,949,841 | 4/1976 | Jovick et al. | 310/168 X |
| 3,952,220 | 4/1976 | Staudt et al. | 310/75 R |
| 3,960,248 | 6/1976 | Tribe | 188/181 R |
| 3,978,357 | 8/1976 | Voelbel et al. | 310/168 |
| 4,027,753 | 6/1977 | Lantz | 188/181 R |

Primary Examiner—Donovan F. Duggan
Attorney, Agent, or Firm—Burns, Doane, Swecker & Mathis

[57] ABSTRACT

An electrical speed sensor having a pair of relatively confrontingly rotatable pole members one of which is fixed to the transmission housing of a vehicle while the other members being connected for rotation to a shaft driven by an output shaft of the transmission, characterized by provision of a shaft coupling interposed between the shaft and the said one of the pole mmebers and being rigid in torsion only, to thereby block transmitting of any deflection from the shaft to the said one of the members, with an accurate electric output from the sensor ensured.

2 Claims, 2 Drawing Figures

ELECTRICAL SPEED SENSOR

BACKGROUND OF THE INVENTION

This invention relates to an electrical speed sensor having a pair of relatively confrontingly rotatable pole members, one being fixed to the transmission housing of a vehicle and the other being connected for rotation to a shaft driven by an output shaft of the transmission.

In order to increase the efficiency of the sensor, it is required to reduce the air gap between the pole members to a minimum. For meeting such requirement it has been the practice in the art to calculate the air gap in design within very small range, such as for example, of from 0.1 to 0.2 mm. It has been found that any deflection or rattle of one of the members, such as a rotor, relative to the other member, such as a stator, causes a considerable rate of variation of the electric output of the sensor whatever small amount the deflection may be. The variation of the electric output results into an unavailable output for being employed as a signal indicating the rotational speed of the vehicle wheel for the purpose of any controlling system of the vehicle.

In order to prevent the deflection or rattle of the rotor, it has been tried to flexibly or pivotally couple a driving shaft of the sensor with the rotor, so that any deflection or rattle of the driving shaft is provented from being transmitted to the rotor, by such coupling.

The use of this coupling entails increase of associating parts and an extra complicated handling of the parts themselves when the sensor is being assembled with added inconvenience and expense to the user.

SUMMARY OF THE INVENTION

The present invention is directed to an electrical speed sensor having a stator and a rotor relatively confrontingly rotatable with each other, characterized by provision of a single driving shaft connected with the rotor through means of a coupling rigid in torsion only, consisting of at least one scraped portion on the driving shaft and an associating portion of the rotor with which the scraped portion is slightly spaced relationship for permitting deflecion of the driving shaft.

Thus in the embodiment, there are comprised a rotor connected to one of a pair of members rotational relative to the other of the members, a stator in confrontation with the rotor and connected to the said the other of the members, a shaft connected with the said one of a pair of members rotational relative to the other of the members, and a coupling to couple the shaft with the rotor in torsionally rigid but deflection permissible relation with the rotor to thereby block transmitting of any deflection from the shaft to the rotor.

DESCRIPTION OF THE PREFERRED EMBODIMENT

Figure 1:
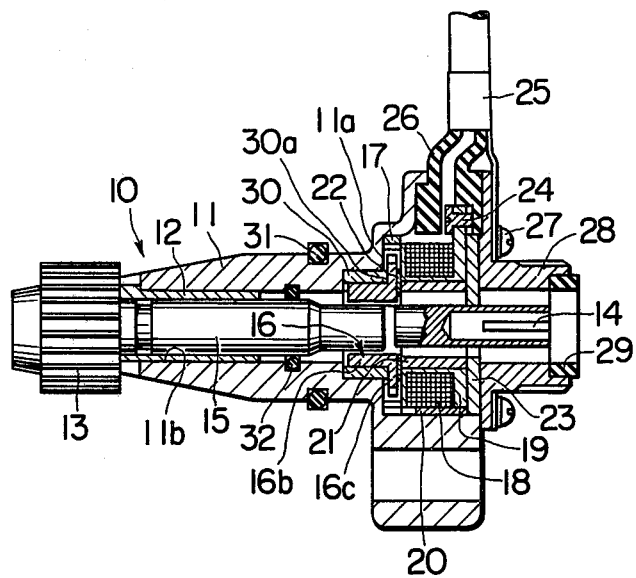
FIG. 1 is an axial cross sectional elevation with some parts shown not in section and others broken away of a sensor assembly embodying features of the present invention.
Figure 2:
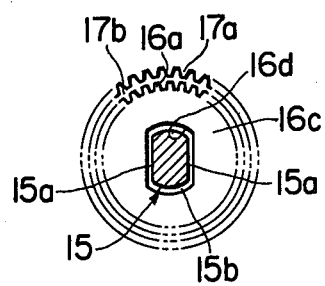
FIG. 2 is a side view of a rotor of the sensor of FIG. 1.

Referring now to FIGS. 1 and 2 of the drawing, the sensor assembly is generally indicated by the numeral 10 and is shown in assembly relationship with a transmission (not shown) of a vehicle, which transmission includes an input shaft connected to the engine driving shaft and output shaft connected to an axle shaft (not shown) which terminates at its outer end in flanges (not shown) to which are mounted vehicle wheels. An outer sleeve 11 is secured at its at least one portion to a housing of the transmission by a convenient means. Within the sleeve 11 is rotatably mounted a driving shaft 15 at the left end of which is formed with a driven gear 13. The gear 13 meshes with a driving output gear (not shown) of the transmission. The shaft 15 has at its right end an axial groove 14 to operatively connect with an end of a flexible but rigid in torsion cable which is in turn connected to any indicator or meter means employed for controlling the vehicle driving, such as a vehicle speed meter. The numeral 12 represents a bearing bush for rotatably mounting the shaft 15. Another bearing 30 of shorter bushing form is coaxially firmly mounted within the stepped broe 11b of the sleeve 11 for rotatingly supporting a rotor member 16. The rotor 16 consists of a tubular portion 16b, and a flange 16c. As best shown in FIG. 2, the flange 16c is provided with along its periphery teeth 16a regularly intervalled, radially outwardly extending therefrom. The rotor 16 is in torsion rigid relation with the driving shaft 15 as will be understood from the illustration in FIG. 2.

The shaft 15 has scraped portions 15a engaging a correspondingly shaped hole 16d in torsion rigid relationship with the rotor. The non-circular outer periphery of the shaft consists of a plurality of circumferentially extending side surfaces joined end-to-end to form a continuously circumferentially extending outer periphery. It will be seen in FIG. 2 a slight clearance 15b formed along the outer periphery of the shaft 15. This clearance is very inportant to obtain the desired result of the invention as will be explained as the discussion proceeds. Due to the clearance 15b, the shaft 15 is permitted to deflect or rattle without adversely influencing a rigidity in torsion provided by the scraped portions and the hole 16d.

A ring form stator 17 is coaxially firmly secured to the internal face of the bore 11b of the sleeve 11 and has in its internal face a plurality of uniformly disposed radially inwardly extending teeth 17a (FIG. 2) which are located in radial confrontation with the teeth 16a.

With the assembly of the rotor 16 by means of the bearing 30, an constant air gap 17b is ensured between the rotor teeth 16a and the stator teeth 17a without any substantial variation in spite of any radial deflections, tolerance in the manufactue, or even misalignment of the shaft 15.

The right hand side face 30a of the bearing 30 extends beyond the left hand side face 11a of the annular cavity in which is mounted the stator 17 so that the flange 16c of the rotor 16 is spaced from the face 11a.

An electrical coil 18 is wound on a plastic resin bobbin 19 which is located in rigid relationship with the sleeve 11 as hereinbelow described in greater detail. The bobbin 19 is fast to the yoke 20 and the yoke 20 is in turn fast to the rotor 17 which is also fast to the sleeve 11 so that the bobbin 19 is stationary together with the coil 18 on the sleeve 11. Another yoke 23 is interposed between the right hand face of the yoke 20 and a cap 28 which is secured to the right hand face of the sleeve 11 by means of a plurality of set screws 27. An annular permanent magnet 21 firmly closely fitts the central bore of the bobbin 19 and an annular thrust washer 22 is interposed between the magnet 21 and the rotor 16.

The washer 22, annular magnet 21 and yoke 23 are in series in abutment relationship with each other and locate as a unit between the cap 28 and the rotor 16 to provide a thrust sliding fit of the washer 22 on the rotor 16. On the other hand, the yokes 23 and 20 fit as a unit to an interval between the stator 17 and the cap 28. With the assembly as shown and described thus far, the stator 17, yokes 20 and 23, bobbin 19 with coil 18 and magnet 21 with washer 22 are all kept stationary as a unit relative to the sleeve, while permitting the rotor 16 to rotate without being axially and radially rattled.

An annular spacer 29 of plastic resin material is an associating part for the shaft 15 in assembly with a flexible and rigid in torsion cable to drive any meter used for controlling the vehicle travelling. Seal rings 31 and 32 prevent escape of the lubricant as usually. These parts do not form the invention and are sonsidered to need no further description.

The numeral 25 indicates a holder of the terminal ends of the coil 18. The holder 25 is fixed to the cap 28 by utilizing one of the screws 27 threaded into the body of the sleeve 11 for fastening the cap 28 to the sleeve 11. The numeral 24 indicates a clamping member to connect the terminal ends to the lead wires (not shown) and also to fix the terminal ends to the plastic resin bobbin 19. The rubber bush 26 covers the terminal ens in order to keep them in electrically insulated condition from the holder and other metal parts.

Since the members, rotor 16, stator 17, washer 22, yokes 20 and 23, are all of magnetizable metal, so that a magnet flux circuit is formed of them according to the polarity of the magnet 21. As the teeth 16a and 17a are magnetic confrontation with each other, the rotation of the rotor 16 relative to the stator 17 causes the magnetic reluctance of the air gap between the teeth to vary, thus causing an electric output from the coil 18. The electric output is proportional to the rotational speed of the rotor, namely the rotational speed of the vehicle wheels. The output is accordingly used as a signal indicating the rotational speed of the vehicle wheel for controlling the vehicle travel such as anti-skid controlling of the vehicle.

The most significant structural characteristic of the sensor according to the invention is that the driving shaft 15 is coupled with the rotor 16 through means of a shaft coupling which is rigid in torsion only. The coupling is enabled to exactly transmit torsion to the rotor 16 neverthless any deflection, rattle or even misalignment of the shaft 15 is permitted relative to the rotor. Since a constant air gap is maintained between the teeth of the rotor 16 and the teeth of the stator 17 regardless of the deflection of the shaft 15, an output exactly proportional to the rotational speed of the vehicle wheel is available from the coil 18. A signal being strictly in accord with the rotational speed of the vehicle wheel is thus obtained for any control purpose of the vehicle travel.

What is claimed is:

1. An electrical rotational speed sensor for providing an electrical signal indicative of the rotational speed between a pair of members with one of the members supported for rotation relative to the other, the sensor comprising: a rotor connected to said one of the members for rotation therewith, a stator in magnetic confrontation with the rotor and connected to the other of the members, a shaft connected with the said one of the members supported for rotation relative to the other for transmitting rotation thereto, said shaft carrying a driven gear at one end which is drivingly coupled to a transmission output gear and means for coupling the shaft with the rotor to transmit torsional forces therebetween while permitting radial, axial and angular deflection therebetween, to prevent any deflection of the shaft from being transmitted to the rotor, said last-named means comprising a non-circular outer periphery of said shaft disposed within a correspondingly configured opening in said rotor, said periphery consisting of a plurality of side surfaces joined end-to-end and extending in circumferential directions, independently of radially extending surfaces, to form a continuously circumferentially extending outer periphery.

2. A sensor according to claim 1 wherein said outer periphery consists of four sides such that the cross section of said shaft is generally rectangular.

* * * * *